United States Patent
Teggatz et al.

(10) Patent No.: US 7,808,127 B2
(45) Date of Patent: Oct. 5, 2010

(54) MULTILE INPUT CHANNEL POWER CONTROL CIRCUIT

(75) Inventors: Ross E. Teggatz, McKinney, TX (US); Wayne T. Chen, Plano, TX (US); Brett E. Smith, McKinney, TX (US)

(73) Assignee: Triune IP LLC, Richardson, TX (US)

( * ) Notice: Subject to any disclaimer, the term of this patent is extended or adjusted under 35 U.S.C. 154(b) by 192 days.

(21) Appl. No.: 12/185,306

(22) Filed: Aug. 4, 2008

(65) Prior Publication Data

US 2010/0026100 A1 Feb. 4, 2010

(51) Int. Cl.
*H02J 1/00* (2006.01)
*G05F 1/577* (2006.01)

(52) U.S. Cl. .............. 307/84; 307/72; 307/80; 307/82; 323/267

(58) Field of Classification Search ............. 307/72, 307/73, 74, 75, 80, 82, 84; 323/267
See application file for complete search history.

(56) References Cited

U.S. PATENT DOCUMENTS

| | | | | | |
|---|---|---|---|---|---|
| 4,006,401 | A | * | 2/1977 | Villasenor de Rivas | 323/362 |
| 5,332,979 | A | * | 7/1994 | Roskewitsch et al. | 331/68 |
| 5,430,604 | A | * | 7/1995 | Wong | 361/230 |
| 6,373,231 | B1 | * | 4/2002 | Lacey et al. | 323/268 |
| 7,148,587 | B2 | * | 12/2006 | Matsuda et al. | 307/80 |
| 7,230,819 | B2 | * | 6/2007 | Muchow et al. | 361/601 |
| 7,256,568 | B2 | * | 8/2007 | Lam et al. | 323/222 |
| 7,498,694 | B2 | * | 3/2009 | Luo et al. | 307/82 |
| 2006/0137348 | A1 | * | 6/2006 | Pas | 60/641.1 |
| 2009/0261657 | A1 | * | 10/2009 | Chen et al. | 307/80 |
| 2009/0295229 | A1 | * | 12/2009 | Harke | 307/75 |

* cited by examiner

*Primary Examiner*—Hal I Kaplan
(74) *Attorney, Agent, or Firm*—Konczal Law Firm PLL

(57) ABSTRACT

The disclosed apparatus and systems are adapted to implement dynamic power control in order to condition and store, and/or immediately utilize, energy from one or more available power inputs, whether the inputs are constantly, regularly, or intermittently available, singly or in various combinations. Power control circuits according to the invention provide means for dynamically responding to input availability and output requirements in order to prioritize input energy selection, input signal conditioning, and output power delivery adapted to the application and operating environment.

15 Claims, 3 Drawing Sheets

MULTILE INPUT CHANNEL POWER CONTROL CIRCUIT

TECHNICAL FIELD

The invention relates to power control circuitry. More particularly, the invention relates to apparatus and systems for receiving, conditioning, and outputting power from various input power or energy sources for ultimately supplying power to a load, or for charging a storage element such as a battery and then supplying power to a load.

BACKGROUND OF THE INVENTION

The need for some form of power control circuitry is ubiquitous in electronics. Many power sources are available to electronic system designers. Multiple energy or power sources are often accessible to some degree, however, their availability may occur intermittently and in various combinations, making capitalizing on their availability problematic. Examples of potential power sources that may be capable of using energy available in a system's operating environment include; piezoelectric generators, solar generators such as photovoltaic circuits, thermoelectric "Seebeck" generators, wind or other mechanical generators, conventional AC sources, disposable batteries, and so forth. Such sources may or may not be continuously available, due to the nature of the energy source, or due to changes in the operating environment of the electronic system. Therefore, an intermediate storage element such as a rechargeable battery or capacitor is often used in order to provide continuity of supply. For example, energy is captured from an available source, e.g., vibration energy is harnessed using a piezoelectric generator, and is stored, e.g., with a battery or array of batteries, for ultimate use by an electrical load. Thus, circuitry useful for charging storage elements such as capacitors or batteries is an important consideration in the design of electronic systems, and particularly for portable systems. In addition to the variability of energy sources, the output needs encountered by a given electronic system may also be variable. Examining batteries as a common example of power control, it is well known that restoring a discharged battery to a fully charged state, and maintaining it in a fully charged condition, is a multifaceted problem involving a number of factors. For example, battery chemistry, (e.g., Nickel-Cadmium (Ni—Cd), Nickel Metal-Hydride (NiMH), and Lithium-Ion (Li-ion)), battery age, useful life, physical environment, capacity, and number of cells, are just some of the factors that must be considered in selecting not only a suitable battery, but also a power control circuit to optimally utilize the battery. The availability of charging power is one such consideration that must be addressed in charging system and associated power control design. Useable apparatus and systems for harnessing variable and intermittent input power levels for power control circuits and electronic systems would provide useful advantages in the arts.

It is known that it is often necessary to provide selectable charging level controls for regulating the output of charging circuitry. Charging circuits known in the arts are generally designed for accepting a fixed input power level, and for selecting from two or more predetermined output power levels in order to charge a storage element. For example, in some applications, such as a "universal" charger, it is desirable to accommodate different capacity batteries by providing different pre-determined charging output levels. Appropriate charging rates are generally dependent upon battery chemistry and construction. Generally, fast charging refers to methods that can charge a storage element in one to two hours, and slow charging refers not only to longer charging periods, but also implies a charging level low enough that overcharging the battery is less of a potential problem. It is known in the arts to provide selectable pre-determined charging levels based on a scheme for fast charging a battery (or other storage element) up to a set level, and then providing a lesser slow charging current for maintaining the storage element in a fully charged state. Such charging schemes typically rely on some form of temperature or voltage sensing, and perhaps a timer, in order to protect against overcharging, which could result in shortening battery life, battery failure, or a spectacular explosion. At the other end of the charging continuum, for most battery types, once the battery is discharged into an undervoltage, or overdischarged, condition, a continuing voltage or current draw from the battery beyond the undervoltage level could chemically degrade the battery, permanently reducing its charge capacity, reliability, and useful service life. Thus, particularly for power control systems used with batteries as storage elements, charging circuit efficiency, reverse-current protection, and low quiescent current, are highly desirable traits.

The present invention is directed to overcoming or diminishing problems present in electronics, power control circuitry, and particularly charging systems, of the prior art, and contributes one or more heretofore unforeseen useful advantages to the arts.

SUMMARY OF THE INVENTION

In general, the apparatus and systems of the invention are adapted to implement dynamic power control in order to condition and store, and/or immediately utilize, energy from one or more available power inputs, whether the inputs are constantly, regularly, or intermittently available, singly or in various combinations. It is contemplated that the invention may be used with relatively high or low intensity energy sources for producing power input signals, which may exist in environments commonly encountered by electronic systems. For example, input signals of this nature may include those generated by photovoltaic sources, piezoelectric generators, Seebeck generators, RF generators, mechanical generators such as wind or water turbines, or torque "harvested" as electrical energy by braking rotating machinery. These and similar input power sources, due to their variability, both in availability and intensity, require sophisticated power control circuitry in order to be put to practical use. Multiple input channel power control circuits implemented according to the principles of the invention provide means for dynamically responding to input availability and output requirements in order to prioritize input energy selection, input signal conditioning, and output power delivery adapted to the application and operating environment.

According to one aspect of the invention, examples of preferred embodiments are disclosed in which power control circuits include capabilities for using multiple input power sources and producing one or more outputs. Operably coupled between the input sources and outputs, a conditioning circuit is adapted for dynamically altering the input signals to provide one or more output signals within a selected voltage and current range.

According to another aspect of the invention, in an example of a preferred embodiment, a power control circuit includes input terminals for receiving one or more input power signals as well as one or more output terminals for delivering output signals. A conditioning circuit is configured for receiving the input power signals and for dynamically converting the input power signals into one or more conditioned signals within desired voltage and current ranges. An intermediate storage element is provided in order to receive the conditioned signals from the conditioning circuit. The conditioning circuit, and its intermediate storage element, are capable of providing output signals to the output terminals.

According to another aspect of the invention, an example of a preferred embodiment of a power control circuit further includes reverse blocking circuitry for blocking reverse current at one or more of the terminals.

According to yet another aspect of the invention, an example of a preferred embodiment of a power control circuit includes signal conditioning circuitry having an off-active switching module for continuously monitoring one or more terminals and for dynamically switching the conditioning circuit between on and off states responsive to selected variable circuit parameter thresholds.

According to still another aspect of the invention, an example of a preferred embodiment of a power control circuit includes a number of input terminals for coupling to external power sources. Output terminals are provided for coupling to chargeable storage elements. Also included is sensing circuitry in a configuration for producing sensor signals indicative of selected variable parameters at one or more terminal. The power control circuit includes a conditioning circuit for receiving and altering the input power signals in order to supply desired output signals to the output terminals. Among its functional blocks, the conditioning circuit has a step-up/step-down regulator for adjusting voltage levels up or down as needed. Reverse blocking circuitry is provided for preventing reverse current at the power control circuit terminals. An off-active switch module is also included for continuously monitoring the terminals in order to dynamically switch the power control circuit, or any of its modules, between on and off states responsive to selected variable parameter thresholds.

The invention has advantages including but not limited to providing advantages in economy and efficiency for using a plurality of power sources for charging a storage element or array of storage elements, maintaining a charge level, or powering a load. Further advantages may be realized by harvesting available power inputs for storage or use as opportunities for increased input are manifested, and by prioritizing among potential power inputs. These and other features, advantages, and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

While the making and using of various exemplary embodiments of the invention are described herein, it should be appreciated that the present invention provides inventive concepts which can be embodied in a wide variety of specific contexts. It should be understood that the invention may be practiced with various implementations to suit different practical applications without altering the principles of the invention. For purposes of clarity, detailed descriptions of functions and systems familiar to those skilled in the pertinent arts are not included.

Apparatus and systems of the invention provide useful improvements directed toward the challenges of power control and charging in electronic systems, particularly for applications in which one or more input power sources may be available intermittently, in various combinations, and at varying voltage and current levels. Power received at various input terminals from available energy sources may preferably be utilized according to a selected priority. Input power is conditioned in order to provide usable voltage and current. The apparatus and systems include controls responsive to preprogrammed and dynamically determined output parameters and power input parameters.

Figure 1:
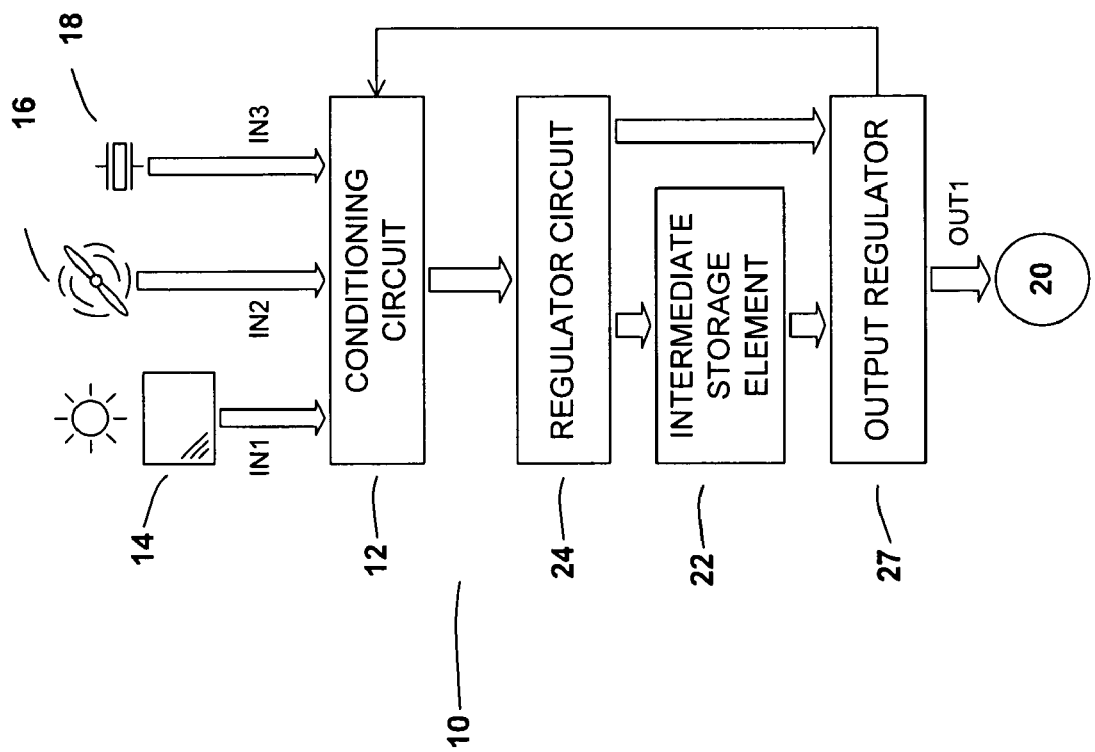
FIG. 1 is a block diagram of an example of a preferred embodiment of a system of the invention.

Now referring primarily to FIG. 1, a simplified overview of an exemplary power control system according to the invention is shown and described. In this block-diagram, a power control system 10 has a conditioning circuit 12, further described below, operably coupled using suitable input terminals 14, 16, 18, to at least one, and preferably several power inputs, such as for example, a photovoltaic device 14, a turbine-driven generator 16, and piezoelectric generator 18. Of course, many alternative power sources may be used without departure from the invention. Each of the power input terminals 14, 16, 18, is capable of delivering a power input signal, denoted IN1, IN2, and IN3 respectively, to the conditioning circuit 12 from a suitable corresponding input source. Preferably, the input signals IN1, IN2, IN3 are variable in availability, intensity, or both. Accordingly, the conditioning circuit 12 is adapted for accepting the input signals IN1, IN2, IN3 in virtually any intensity and combination, limited only by the practical capabilities of the input sources. Preferably, the system 10 may be programmed to prioritize among input sources according to preselected criteria relating to system requirements and anticipated operations. For example, in a particular application, a photoelectric input may be assigned a higher priority than a back-up battery, in order to conserve battery power whenever practical. The input sources are coupled to the conditioning circuit 12 by any suitable conductive connector. Suitable input filters may be included at the input terminals or at the sources in order to smooth input power signals and to minimize noise and electromagnetic interference (EMI) from the system 10 to the input sources and from the input sources to the system 10. Both direct current (DC) and alternating current (AC) sources may be used as known in the arts for charging circuits in general. The conditioning circuit 12 is equipped for dynamically altering one or more, or all, of the received input signals IN1, IN2, IN3 by increasing or decreasing their voltages or currents in order to provide one or more output signals, e.g., OUT1 within dynamically selected ranges at one or more output terminals 20. Preferably, an intermediate storage element 22 such as a battery, capacitor, combination, or array, is provided in order to accept a conditioned signal from the regulator circuit 24 from a conditioning circuit 12 for ultimately contributing to the output OUT1. Additional load elements (not shown) such as electronic circuits or electromechanical apparatus may be directly connected to the output terminals, as well as external storage elements such as batteries, capacitors, either singly or in arrays. External storage or load elements connected to the output terminals for use with the power control circuit 10 may also be concurrently coupled with additional external power sources, devices, and circuitry. For example, the power control circuit 10 may be used for applications that require a constant power supply, in which two storage elements may be connected to the output terminal(s) in an arrangement that allows one storage element to supply power required by a load while the other storage element is recharged using the power control circuit 10. An output regulator 27 is included in order to control the output signals, e.g., OUT1 in this example, according to the needs of the application. For example, in a constant-voltage charger application intended for charging Li-ion batteries, the output regulator may be used to force an output terminal connected to the battery to a set-point voltage, for example, about 4.2V, and upon reaching this threshold, to then provide only enough current sufficient to hold output terminal at the set voltage. For another example, in a constant-voltage regulator application, the output regulator may be used to supply an output terminal connected to a microprocessor to provide power to the said microprocessor.

Figure 2:
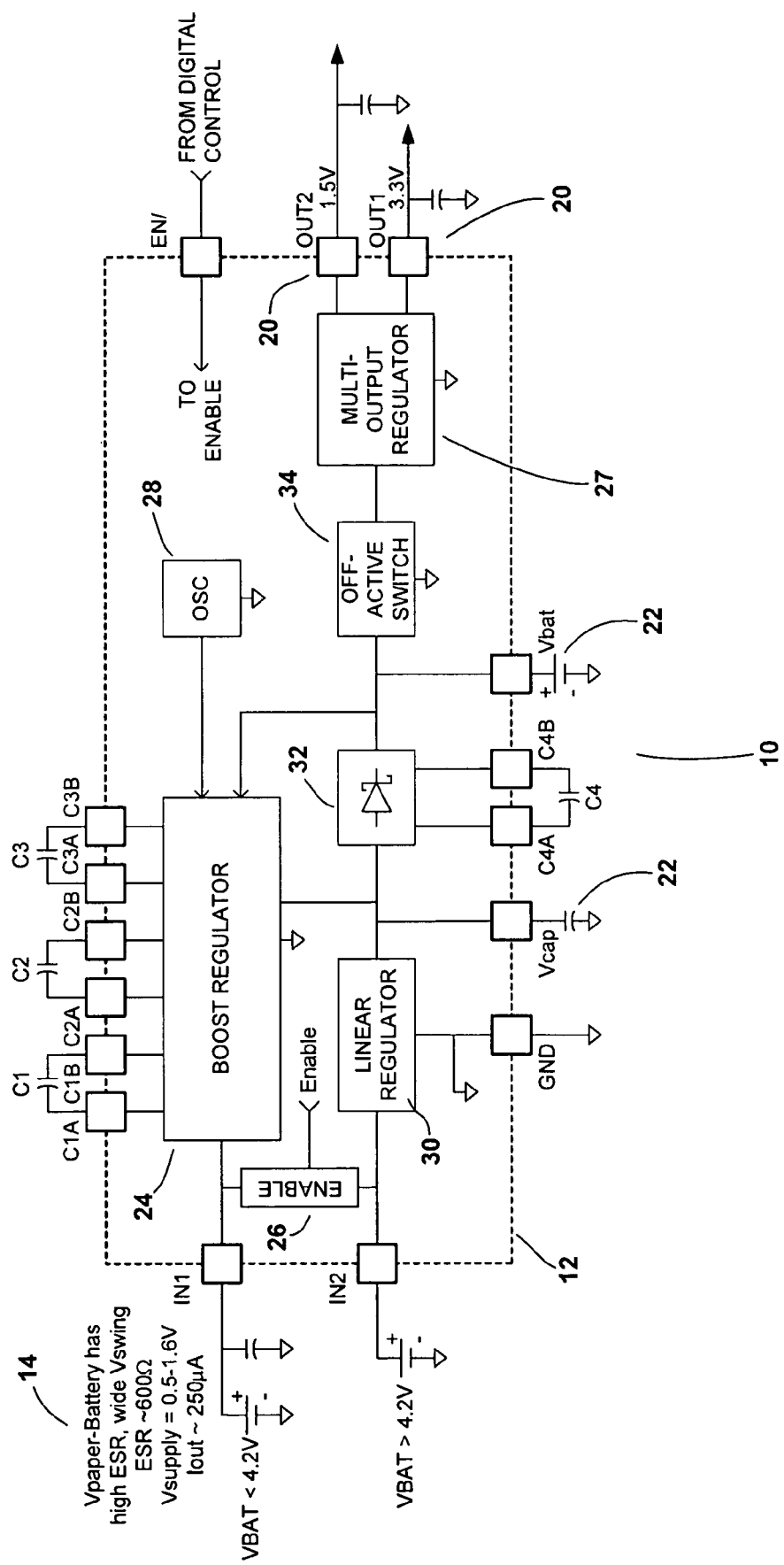
FIG. 2 is a schematic diagram of an example of a preferred embodiment of a circuit according to the invention.

Now referring primarily to FIG. 2, a schematic diagram depicts an example of practical circuitry for components of a preferred embodiment of a power control circuit 10 in more detail. A conditioning circuit 12 has an input terminal 14 coupled to an input source, such as a paper battery, or photovoltaic cell, and output terminals 20 are provided for receiving the output signals OUT1, OUT2, produced by the circuit 10, for example to supply a charge to an external storage element or load (not shown). Preferably, intermediate storage elements 22 such as batteries or capacitors are also included in the power control circuit 10. The intermediate storage elements 22 are preferably charged when a conditioned signal is available in greater abundance than required at the output terminal(s) 20. The intermediate storage elements 22 may then be discharged and power added to the output signals, e.g., OUT1, OUT2 at times when an increase in output power is desired. As shown, the input signal IN1 is received and fed into a regulator module 24, preferably with external bucket capacitors C1, C2, C3 as needed. The regulator module 24 preferably includes step-up/step-down capabilities for conditioning input signals up or down as needed. Preferably, the regulator module 24 output level is set with an enabling switch 26 for selecting an output level based on data relating to the needs of the charge storage element (external to the power control circuit) preferably provided by control means associated with the output terminals 20. An oscillator 28 is preferably provided for controlling the regulator module 24 based on input voltage or current relative to the desired output. A linear regulator 30 is preferably provided for regulating IN2 voltage to a selected output level. Reverse-blocking circuitry 32 is also preferably provided in order to prevent reverse current in the event the input voltages are at a lower potential that the voltage across the output terminal 20. Preferably, an off-active switch 34 is also provided as part of the conditioning circuit 12 as well. The off-active switch 34 is adapted to conserving power by being particularly configured to draw ultra-low bias current when active, and no current when in the "off" state. In the "off" state, the off-active switch 34 will disconnect the intermediate storage elements, e.g., Vcap 22, Vbat 22, from the multi-output regulator 27.

Figure 3:
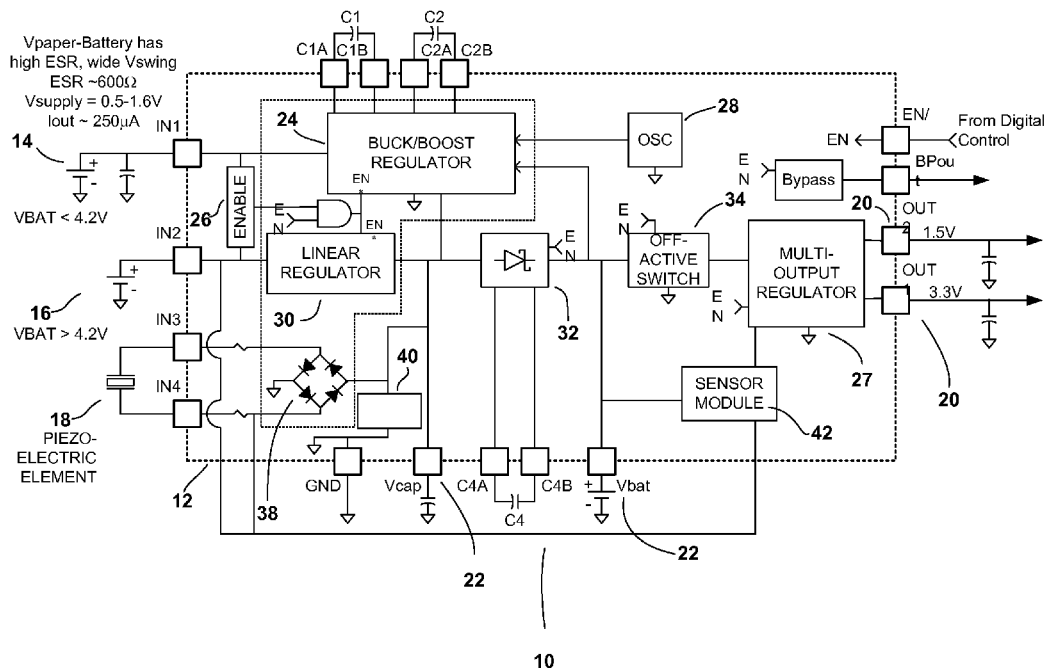
FIG. 3 is a schematic diagram of an example of a preferred embodiment of a circuit according to the invention.

The possible variations of implementations of the apparatus and systems using the invention are many and cannot, and need not, all be shown. An additional example of a preferred embodiment of a power control circuit is provided in FIG. 3. In this example, the circuit 10 includes power inputs to a conditioning circuit 12 from a low-power battery such as a paper battery 14, a DC source 16, such as a more powerful battery, and a piezoelectric generator 18. In this example, the input signal IN1, is preferably transferred to a regulator module 24 with associated bucket capacitors C1, C2. An enable switch 26 is used to select input level. As in the preferred embodiment described with reference to FIG. 1, an oscillator 28, boost regulator 24, bridge rectifier 38, and linear regulator 30 are preferably used to control the step-up/step-down regulator module 22 based on input signal, e.g., IN1, IN2, IN3, and IN4 levels and output OUT1, OUT2 requirements. Also in common with the above-described embodiment, the regulator circuit 12 preferably includes reverse-blocking circuitry 32 and off-active switch 34. As shown at reference numeral 38, a rectifier, such as a bridge rectifier, may be included for conditioning input signals, such as, IN3, IN4, from the piezoelectric generator 18. Such an arrangement shown in this example is generally preferred for applications in which input polarity is not fixed and/or in which smoothing of an input signal may be required. A shunt module 40 may preferably be included for shunting excess power from the inputs as required for potential input levels anticipated for particular implementations.

A sensor module 42 is preferably adapted for dynamically monitoring various parameters, particularly voltage, current, or temperature, at the terminals of the system 10 and for providing feedback useful to the conditioning circuit 12. The sensor module 42 preferably includes capabilities for sensing selected variable parameters at the output terminals 20 and/or at connected external storage elements. Preferred embodiments may typically include voltage detectors and temperature detectors positioned proximal the output terminals 20, or connected storage elements in order to generate feedback signals reflective of conditions at the storage elements. The sensing module 42 may include switching means for interrupting the operation of the system 10 in the event that selected overvoltage or overheating thresholds are reached. For example, in a charging system, the sensor module may be configured to sense voltage level ranges acceptable for the terminals. Under operating conditions at voltages below a selected maximum output voltage threshold, the step-up capabilities of the regulator module may then be used to increase the voltage of the received input signals in order to produce a higher output voltage. In the event a higher input voltage is present, the step-down capabilities may be used to decrease the input voltage to acceptable output levels. In the event an overvoltage or reverse voltage condition is sensed, the inputs may be shunted, stored in intermediate storage elements, or switched off as appropriate to the circumstances. Sensor modules may similarly be used to dynamically switch one or more of the inputs or outputs independently according to operating conditions. It should be appreciated by those skilled in the arts that the power control circuit may be used to implement a variety of different charging modes such as an initial fast charge followed by a trickle charge.

The multiple input channel power control circuitry of the invention contributes one or more useful advantages not otherwise present in the arts, including but not limited to providing power control capabilities for efficient and opportunistic energy harvesting for electronic devices and charge storage elements. While the invention has been described with reference to certain illustrative embodiments and particular advantages, those described herein are not intended to be construed in a limiting sense. For example, variations or combinations of steps or apparatus in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A power control circuit comprising:
a plurality of input terminals for receiving input power signals;
a plurality of output terminals for delivering one or more output signals;
one or more conditioning circuits operably coupled to receive the input power signals, wherein the conditioning circuits further comprises:
one or more off-active switching modules for continuously monitoring one or more output terminals and for dynamically switching the conditioning circuits between on and off states responsive to selected output terminal voltage thresholds;
a step-up regulator for dynamically conditioning input power signals from one or more of the inputs to provide one or more output signals having selected voltage and current characteristics;
a step-down regulator for dynamically conditioning input power signals from one or more of the inputs to provide one or more output signals having selected voltage and current characteristics;
a rectifier adapted for dynamically conditioning input power signals from one or more of the inputs to provide one or more output signals having selected voltage and current characteristics;
reverse blocking circuitry for blocking reverse current at one or more of the terminals;
an output regulator for dynamically regulating output signals according to selected voltage and current characteristics;
one or more sensor modules adapted for dynamically monitoring one or more variable characteristics of the input signals, conditioned signals, and output signals, and for providing feedback to the conditioning circuit for use in dynamically controlling output signals; and
one or more intermediate storage elements adapted to deliver a conditioned circuit signal to an output terminal;
wherein the conditioning circuits are adapted for dynamically converting the input power signals into one or more conditioned signals within dynamically determined voltage and current ranges.

2. The power control circuit according to claim 1 wherein the conditioning circuit further comprises one or more sensor modules adapted for dynamically monitoring one or more voltage characteristics of the input signals, conditioned signals, and output signals, and for providing feedback to the conditioning circuit for use in dynamically controlling output signals.

3. The power control circuit according to claim 1 further comprising at least one charge storage element operably coupled to an output terminal, and further comprising one or more sensor modules adapted for dynamically monitoring one or more variable characteristics of the storage elements for providing feedback to the conditioning circuit for use in dynamically controlling output signals.

4. The power control circuit according to claim 1 wherein the conditioning circuit further comprises one or more shunt modules adapted for receiving one or more excessive input power signals from one or more of the inputs for use in dynamically controlling output signals.

5. The power control circuit according to claim 1 further comprising one or more photovoltaic array operably coupled to an input terminal for providing an input power signal to the conditioning circuit.

6. The power control circuit according to claim 1 further comprising one or more electro-mechanical generator operably coupled to an input terminal for providing an input power signal to the conditioning circuit.

7. The power control circuit according to claim 1 further comprising one or more piezoelectric generator operably coupled to an input terminal for providing an input power signal to the conditioning circuit.

8. A power control circuit comprising:
a plurality of input terminals for receiving input power signals;
a plurality of output terminals for delivering one or more output signals;
one or more conditioning circuits operably coupled to receive the input power signals, wherein the conditioning circuits further comprise:
one or more off-active switching modules for continuously monitoring one or more output terminals and for dynamically switching the conditioning circuits between on and off states responsive to selected output terminal voltage thresholds;
a step-up regulator for dynamically conditioning input power signals from one or more of the inputs to provide one or more output signals having selected voltage and current characteristics;
a step-down regulator for dynamically conditioning input power signals from one or more of the inputs to provide one or more output signals having selected voltage and current characteristics;
a rectifier adapted for dynamically conditioning input power signals from one or more of the inputs to provide one or more output signals having selected voltage and current characteristics;
reverse blocking circuitry for blocking reverse current at one or more of the terminals;
an output regulator for dynamically regulating output signals according to selected voltage and current characteristics;
one or more sensor modules adapted for dynamically monitoring one or more variable characteristics of the input signals, conditioned signals, and output signals, and for providing feedback to the conditioning circuit for use in dynamically controlling output signals;
one or more sensor modules adapted for dynamically monitoring one or more voltage characteristics of the input signals, conditioned signals, and output signals, and for providing feedback to the conditioning circuit for use in dynamically controlling output signals; and
one or more shunt modules adapted for receiving one or more input power signals from one or more of the inputs for use in dynamically controlling output signals;
one or more intermediate storage elements adapted to deliver a conditioned circuit signal to an output terminal;
wherein the conditioning circuits are adapted for dynamically converting the input power signals into one or more conditioned signals within dynamically determined voltage and current ranges; and at least one charge storage element operably coupled to an output terminal and one or more sensor modules adapted for dynamically monitoring one or more variable characteristics of the charge storage element for providing feedback to the conditioning circuit for use in dynamically controlling output signals.

9. The power control circuit according to claim 8 further comprising one or more photovoltaic array operably coupled to an input terminal for providing an input power signal to the conditioning circuit.

10. The power control circuit according to claim 8 further comprising one or more electro-mechanical generator operably coupled to an input terminal for providing an input power signal to the conditioning circuit.

11. The power control circuit according to claim 8 further comprising one or more piezoelectric generator operably coupled to an input terminal for providing an input power signal to the conditioning circuit.

12. A power control circuit comprising:

a plurality of input terminals for coupling to external sources of power;

a plurality of output terminals for coupling to at least one storage element;

one or more sensing modules coupled for producing one or more sensor signals indicative of selected variable parameters at one or more of the terminals; and one or more conditioning circuits operably coupled to the input terminals for receiving input power signals and operably coupled for supplying output signals to the output terminals, the conditioning circuit further comprising:

one or more step-up/step-down regulators operably coupled to the input terminals for receiving input power signals and to the sensing modules for receiving therefrom one or more sensor signals for use in dynamically determining voltage step-up/step-down levels to be applied to the input power signals;

reverse blocking circuitry operably coupled for preventing reverse current at the terminals;

output regulator circuitry for controlling the output at the output terminals; and one or more off-active switch modules for continuously monitoring one or more output terminals and for dynamically switching the conditioning circuit between on and off states responsive to selected terminal voltage thresholds.

13. The power control circuit according to claim 12 further comprising one or more photovoltaic array operably coupled to an input terminal for providing an input power signal to the conditioning circuit.

14. The power control circuit according to claim 12 further comprising one or more electro-mechanical generator operably coupled to an input terminal for providing an input power signal to the conditioning circuit.

15. The power control circuit according to claim 12 further comprising one or more piezoelectric generator operably coupled to an input terminal for providing an input power signal to the conditioning circuit.

* * * * *

UNITED STATES PATENT AND TRADEMARK OFFICE
CERTIFICATE OF CORRECTION

| | | |
|---|---|---|
| PATENT NO. | : 7,808,127 B2 | Page 1 of 1 |
| APPLICATION NO. | : 12/185306 | |
| DATED | : October 5, 2010 | |
| INVENTOR(S) | : Ross E. Teggatz, Wayne T. Chen and Brett E. Smith | |

It is certified that error appears in the above-identified patent and that said Letters Patent is hereby corrected as shown below:

Title Page, Item (54) and in the Specification at Column 1, line 1 in the title, replace "MULTILE" with "MULTIPLE"

Signed and Sealed this
Sixteenth Day of February, 2016

Michelle K. Lee
*Director of the United States Patent and Trademark Office*